April 28, 1964 W. C. KIRKPATRICK 3,131,240
PROTECTIVE PADDING
Filed Nov. 9, 1960

United States Patent Office 3,131,240
Patented Apr. 28, 1964

3,131,240
PROTECTIVE PADDING
Wylie C. Kirkpatrick, Wayland, Mass., assignor to W. R. Grace & Co., Cambridge, Mass., a corporation of Connecticut
Filed Nov. 9, 1960, Ser. No. 68,221
7 Claims. (Cl. 264—230)

This invention relates to methods and materials for potectively padding articles. More particularly, this invention relates to methods and materials suitable for protectively padding selected areas of articles.

One of the functions of a package is to protect the contents thereof from damage. To properly package any article requires a careful examination and evaluation of many factors, e.g., the nature of the article being packaged, the particular storage and shipping conditions likely to be encountered, and the chemical and physical protection required by such articles. In order to avoid the waste and expense resulting from the failure of the package to protect its contents, much research and testing is being conducted in the field of protective packaging. The problem is not solved simply by the use of large quantities of padding material or the use of costly indestructable containers. What is needed is an inexpensive, yet highly effective, method or material for protecting delicate or sensitive articles.

There has recently been introduced into the packaging art a new class of materials which are particularly suitable for use in cushioning or padding objects. This class of materials which includes expanded plastics and elastomers possesses good or excellent damping properties. Damping is the ability of a material to absorb the energy of an impact or shock or to smother such a shock so that it will not be transmitted to the object being protected. In addition, all of these materials with the exception of some foam rubbers have low densities, e.g., from 0.3 pound per cubic foot up to about 20 pounds per cubic foot. The excellent damping properties and low densities of these materials permit a reduction in size and weight of the resulting package.

Present methods of using these and other cushioning materials require that the object being protected be completely surrounded with or encased in the cushioning material. It has been established that for many objects it is unnecessary to completely surround such objects to provide adequate protection against shock and vibration and that it is only necessary to provide protection at certain vital or sensitive areas. A method of achieving selective spot or area protection with the expanded plastic or foam materials as well as some of the other cushioning materials would be of great value in that it would substantially reduce the amount of cushioning material required without diminishing in any respect the protection being afforded the object so packaged.

It is an object of the present invention to provide novel methods and materials for padding or cushioning objects.

A further object is to provide novel methods and materials for protecting selected areas of an object.

Another object is to provide a cushioning material that is economical, strong, possesses excellent damping properties and is suitable for use with irregular shaped objects.

It is also an object of this invention to reduce the amount of cushioning material required for packaging.

A still further object is to provide a means for holding the cushioning material in place during shipment.

Other and further objects, advantages and features of the present invention will become apparent to those skilled in the art from the following description taken in conjunction with the accompanying drawings in which.

I have discovered a method and material that will accomplish the above set forth objects, i.e., that will provide an economic, reliable and excellent cushioning material that is easily applied to products which are to be protectively cushioned. I have discovered that by coating, covering or securing to flexible, strong materials, a cushioning or padding material that the resulting product is easily applied to the most fragile or sensitive areas of the article being packaged which areas are most likely to experience damage during shipment or storage.

Figure 1:
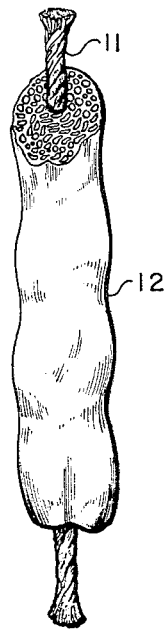
FIGURE 1 is a view of a flexible cord coated with a padding material.
Figure 2:
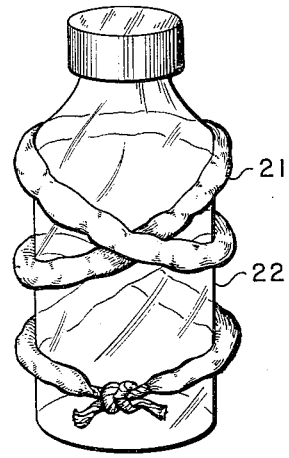
FIGURE 2 is a view of the coated cord of FIGURE 1 wrapped about a glass cylinder.

Referring now to FIGURE 1 of the drawings, there is shown a flexible cotton cord designated as 11 which cord is covered substantially over its entire length with a thick covering or coating 12 of a polyurethane flexible foam. The cord is coated with the solid foam material by passing it through a reacting mass of polyurethane foam producing materials which materials cling to and coat the cord and continue to foam until the reaction is complete and the foam eventually sets. In FIGURE 2, a foam covered cord is wrapped several times about the article to be protected, e.g., a glass bottle 22, and the two free ends of the cord are tied together. The foam, being flexible, can easily conform to any shape. This type of padding is easily applied, merely requiring tying in place, provides a high degree of physical protection at the site where it is most needed and requires a bare minimum of materials. The amount of foam coated cord that would be used will vary with the size of the object to be protected.

Rather than coat the cord in the manner described above it is also possible to extrude the foaming mixture onto the cord. The foam, may easily be scraped from the cord where necessary to facilitate tying. While foam coatings of 1 inch thickness can easily be obtained in the above procedures over ¼ inch cord it is possible to build up thicker coatings by again passing the foam covered cord through a foam producing mixture or by increasing the amount of foaming material extruded onto the cord.

The polyurethane foams are especially preferred in the present invention because of their excellent damping qualities and low density and also because of their ability to adhere to most materials. The preparation of suitable flexible polyurethane foams is described in U.S. Patent 2,764,565.

While flexible foams are especially suitable because of their ability to conform to diverse shapes there may also be employed semi-rigid and rigid polyurethane foams such as those prepared according to the teachings of U.S. Patent 2,787,601.

While the foamed polyurethanes are preferred, other materials which are also suitable for use in the present invention include but are not limited to expanded or foamed products, e.g., polystyrene, polyethylene, polyvinyl chloride, phenol aldehyde and urea aldehyde resins as well as natural and synthetic elastomers.

Figure 3:
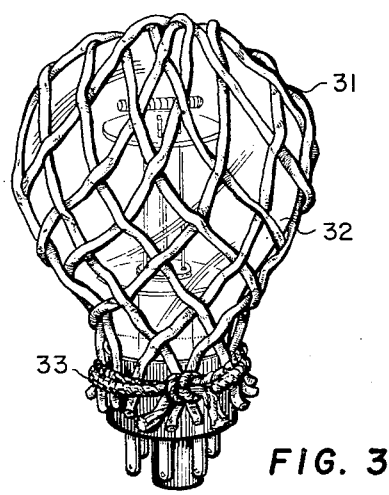
FIGURE 3 is a view of a flexible cord net coated with a padding material surrounding a fragile object.

In place of the cotton cord there may be employed flexible metal wire, flexible net or mesh-like materials, monofilaments and shrinking monofilaments or cords, etc. coated with plastic foam. In FIGURE 3, for example, there is shown a cord net 31 which is coated with a covering of flexible foam which is placed about a fragile glass globe 32. The net is coated with foam by passing through a reacting mass of foam producing material as was done with the flexible cord.

Figure 4:
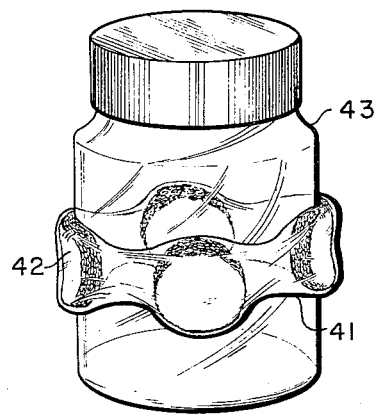
FIGURE 4 is a view of a shrinkable material having sections of a cushioning material attached thereto and wrapped about an object.

In another embodiment of the present invention, there is foamed onto a strip of shrinkable film discrete areas of flexible foam. If the cushioning material will not inherently adhere to the strip of film, the discrete sections of foam may be secured to the strip with a suitable adhesive. FIGURE 4 discloses a strip of heat shrinkable film 41 to which is secured at regular intervals patches of polyurethane foam 42. The strip of film is wrapped about an object 43 and secured in place. The film is then heat shrunk causing the film to tighten against the object 43 thereby holding the padding tightly in place. The foamed material may be foamed between sheets of shrinking film forming a blanket which may be cut into strips suitable for tying about articles. It is also possible to employ a tube of heat shrinkable film containing foam as a padding material. All of the shrinking materials can be shrunk after being tied in place to form a tight, snug wrapping.

The shrinkable materials may be any of the well-known heat shrinkable plastic films such as irradiated, biaxially oriented polyethylene prepared in accordance with the teachings of U.S. Patent 2,877,500 to Rainer et al. or the U.S. application of Baird et al., Serial No. 713,848, filed February 7, 1958 (now U.S. Patent 3,022,543), as well as oriented polyvinyl chloride, saran (vinylidene chloride copolymer) polypropylene, etc.

Selective padding of selected areas of an article is possible and practical using the above-described materials of this invention. These materials are easily secured to the articles being padded, even those of irregular shape. Because of the small quantity of padding material used, there is realized a savings in space and material without any lessening of the protection given the articles.

The invention described in detail in the foregoing specification is susceptible to changes and modifications as may occur to persons skilled in the art and is not limited to the precise details of construction as shown and described herein. The terminology used in the specification is used for purposes of description and not of limitation, the scope of the invention being defined in the claims.

I claim:

1. A method of protecting an article against shocks and vibrations which comprises securing a cushioning material to a strip of shrinkable material, wrapping the shrinkable material about the article to be protected and shrinking the shrinkable material to hold the cushioning material tightly in place.

2. A method according to claim 1 wherein said cushioning material is a flexible solid foam material.

3. A method according to claim 1 wherein said shrinkable material is a heat shrinkable plastic film.

4. A method of protecting an article against shocks and vibrations which comprises fixedly attaching discrete portions of solid flexible plastic foam material to a strip of flexible heat shrinkable film material, wrapping the film strip about the article to be protected, and then shrinking the film strip to hold the foam material portions tightly in place.

5. A method of protecting an article against shocks and vibrations which comprises fixedly attaching discrete portions of solid flexible plastic foam material to a strip of flexible heat shrinkable film material, wrapping the film strip about the article to be protected with the foam portions between the article and the film strip, and then shrinking the film strip to hold the foam material portions tightly in place.

6. A method of protecting an article against shocks and vibrations which comprises wrapping at least one strip of flexible heat shrinkable film to which there are fixedly attached discrete portions of solid flexible plastic foam material about the circumference of the article to be protected and then shrinking the film strip to hold the foam material protions tightly in place.

7. A method of protecting an article against shocks and vibrations which comprises wrapping at least one strip of flexible heat shrinkable film to which there are fixedly attached discrete portions of solid flexible plastic foam material about the circumference of the article to be protected with the foam portions between the article and the film strip and then shrinking the film strip to hold the foam material portions tightly in place.

References Cited in the file of this patent

UNITED STATES PATENTS

| | | |
|---|---|---|
| 272,323 | Redlich | Feb. 13, 1883 |
| 987,162 | Oglesby | Mar. 21, 1911 |
| 1,170,401 | Boley | Feb. 1, 1916 |
| 1,937,537 | Walthor | Dec. 5, 1933 |
| 2,346,613 | Rumsey | Apr. 11, 1944 |
| 2,449,591 | Couse | Sept. 21, 1948 |
| 2,751,629 | Dick | June 26, 1956 |
| 2,792,320 | Bower | May 14, 1957 |
| 2,809,760 | Clark | Oct. 15, 1957 |
| 2,925,624 | Stahl et al. | Feb. 23, 1960 |
| 2,979,246 | Liebeskind | Apr. 11, 1961 |
| 3,051,601 | Schick | Aug. 28, 1962 |

FOREIGN PATENTS

| | | |
|---|---|---|
| 126,869 | Great Britain | May 22, 1919 |
| 409,826 | Great Britain | May 10, 1934 |
| 821,537 | Great Britain | Oct. 7, 1959 |
| 522,473 | Italy | Apr. 7, 1955 |
| 978,577 | France | Nov. 29, 1950 |